United States Patent
Bukin

(10) Patent No.: US 9,838,291 B2
(45) Date of Patent: Dec. 5, 2017

(54) MULTICORE PROCESSING OF BIDIRECTIONAL TRAFFIC FLOWS

(71) Applicant: CELLOS SOFTWARE LTD, Melbourne (AU)

(72) Inventor: Dmitry Bukin, Melbourne (AU)

(73) Assignee: CELLOS SOFTWARE LTD, Melbourne (AU)

( * ) Notice: Subject to any disclaimer, the term of this patent is extended or adjusted under 35 U.S.C. 154(b) by 207 days.

(21) Appl. No.: 14/263,799

(22) Filed: Apr. 28, 2014

(65) Prior Publication Data
US 2015/0036513 A1 Feb. 5, 2015

Related U.S. Application Data

(60) Provisional application No. 61/861,551, filed on Aug. 2, 2013.

(51) Int. Cl.
*H04L 12/26* (2006.01)
*H04L 12/851* (2013.01)
*H04L 29/06* (2006.01)

(52) U.S. Cl.
CPC ............ *H04L 43/12* (2013.01); *H04L 43/026* (2013.01); *H04L 43/04* (2013.01); *H04L 47/2441* (2013.01); *H04L 69/22* (2013.01)

(58) Field of Classification Search
CPC ....... H04L 43/12; H04L 43/026; H04L 43/04; H04L 47/00; H04L 47/2441; H04L 47/2483; H04L 69/22; H04L 49/90; H04L 45/74; H04L 45/745; H04L 45/7453
See application file for complete search history.

(56) References Cited

U.S. PATENT DOCUMENTS

| | | | |
|---|---|---|---|
| 7,420,992 B1 * | 9/2008 | Fang | H04L 12/4633 370/477 |
| 8,014,282 B2 | 9/2011 | Li et al. | |
| 8,463,887 B2 | 6/2013 | Rajan et al. | |
| 2007/0271374 A1 * | 11/2007 | Shomura | H04L 43/022 709/224 |
| 2010/0293353 A1 * | 11/2010 | Sonnier | G06F 15/167 711/170 |
| 2012/0033673 A1 * | 2/2012 | Goel | H04L 49/70 370/400 |
| 2012/0134266 A1 * | 5/2012 | Roitshtein | H04L 47/125 370/230 |
| 2012/0163389 A1 * | 6/2012 | Zhang | H04L 45/24 370/400 |

* cited by examiner

*Primary Examiner* — Ricky Ngo
*Assistant Examiner* — Stephen Steiner
(74) *Attorney, Agent, or Firm* — Shumaker, Loop & Kendrick, LLP

(57) ABSTRACT

A method of assigning a core to process a packet in a data network and a device using the same are provided in the present invention. The method comprises: extracting a traffic flow identifier from a packet in a traffic flow of a link in the data plane; performing a HASH function calculation on the traffic flow identifier to generate a HASH result V; performing a logical AND calculation on the HASH result V and a preconfigured array size parameter to generate a lookup index; using the lookup index to find a worker index in a preconfigured worker array that represents one of N cores assigned to process the packet; and processing the packet by the assigned one of N cores.

20 Claims, 11 Drawing Sheets

MULTICORE PROCESSING OF BIDIRECTIONAL TRAFFIC FLOWS

FIELD

The present invention relates to multicore processing of bidirectional traffic flows in data networks.

BACKGROUND

Monitoring of bidirectional traffic flows in data networks, such as Long Term Evolution (LTE) mobile communication networks, requires extremely high levels of processing performance. To provide this high-level performance, it has previously been proposed to use multicore/multithread processors in network monitoring systems.

In this context, there is a need for solutions to configure multicore processors to perform packet processing at flow level in bidirectional traffic flows.

SUMMARY

According to the present invention, there is provided a method of assigning a core to process a packet in a data network, comprising:

extracting a traffic flow identifier from a packet in a traffic flow of a link in data plane at an input network interface;

performing a HASH function calculation on the traffic flow identifier to generate a HASH result V at a core assignment unit;

performing a logical AND calculation on the HASH result V and a preconfigured worker array size parameter to generate a lookup index at the core assignment unit;

using the lookup index to find a worker index in a preconfigured worker array that represents one of N cores assigned to process the packet at the core assignment unit; and processing the packet by the assigned one of N cores from a multi-core processor unit.

Before the step of extracting a source identifier from a packet in a unidirectional flow of a link in the data plane, the method further comprises:

generating the preconfigured worker array to contain M worker indexes that respectively representing N cores in a multicore processor in the data plane of the data network, wherein $M=2^k$, and where k, M and N are positive integers; and generating the preconfigured worker array size parameter to be M−1.

M may be greater than N.

The worker array may be represented as {0, 1, 2, 3, . . . , N−1, 0, 1, 2, . . . , N−1, 0, 1 . . . , L−1}, where M % N=L, where "%" is modulus operator and L is a positive integer, wherein M indicates the size of the worker array.

The source identifier may be selected from a group comprising source IP address, destination IP address, source port number, destination port number, Tunnel Endpoint Identifier (TEID).

The multicore processor may be a link processor that is configured to collect bidirectional traffic flow statistics in the data plane.

The present invention also provides a device for multi-core processing in a data network, comprising:

at least one input network interface configured to receive at least one packet from at least one traffic flow of a link in data plane;

a packet inspection unit configured to extract a traffic flow identifier from a packet in the at least traffic flow of a link in the data plane;

a multi-core processor unit configured to perform a HASH function calculation on the traffic flow identifier to generate a HASH result V and to perform a logical AND calculation on the HASH result V and a preconfigured worker array size parameter to generate a lookup index; and a core assignment unit configured to use the lookup index to find a worker index in a preconfigured worker array that represents one of N cores assigned to process the packet and the assigned one of N cores processes the packet.

BRIEF DESCRIPTION OF DRAWINGS

Embodiments of the invention will now be described by way of example only with reference to the accompanying drawings, in which.

DESCRIPTION OF EMBODIMENT

Figure 1:
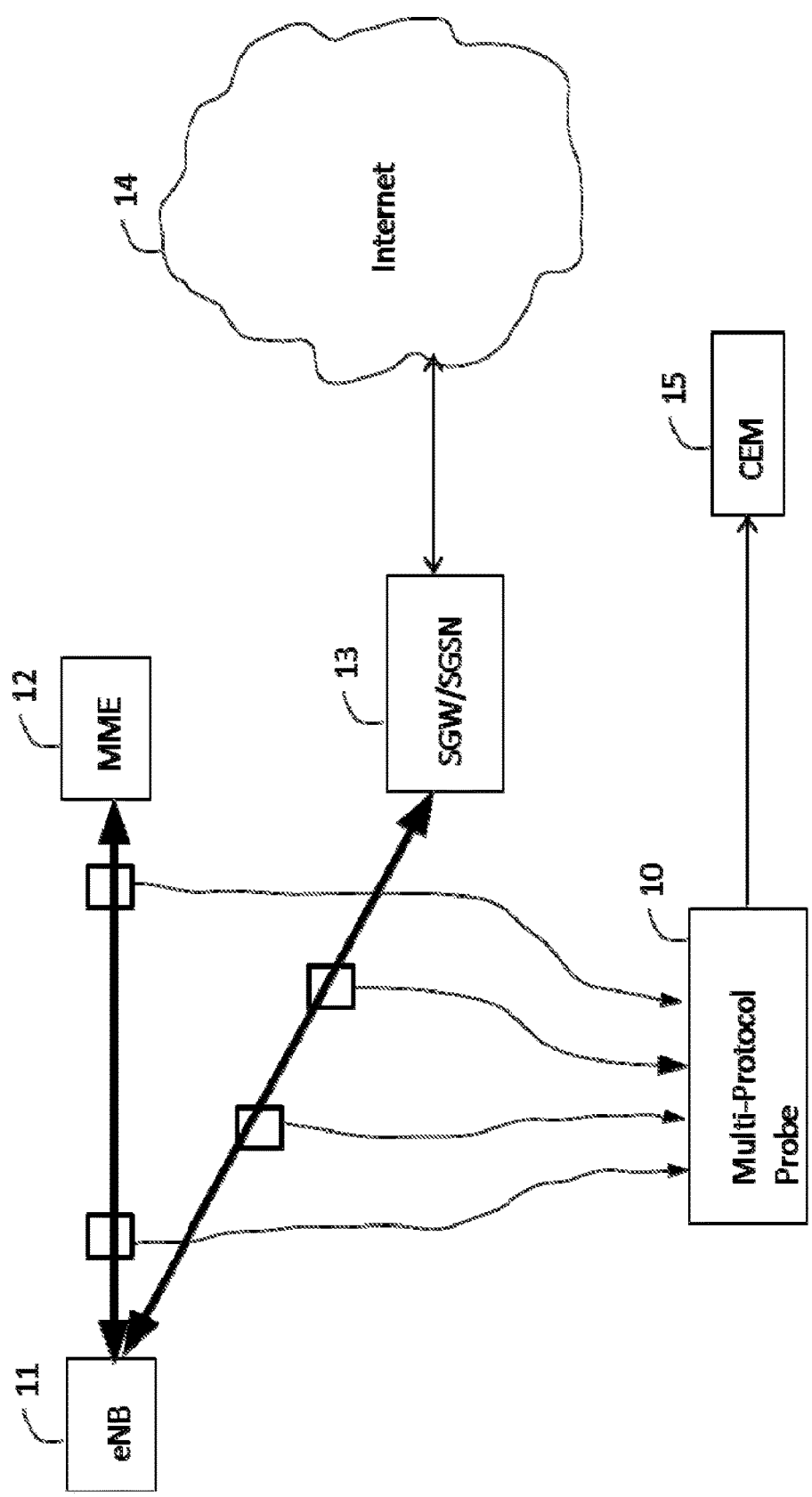
FIG. 1 is a schematic diagram of a core LTE network including a multiprotocol monitoring probe.
Figure 2:
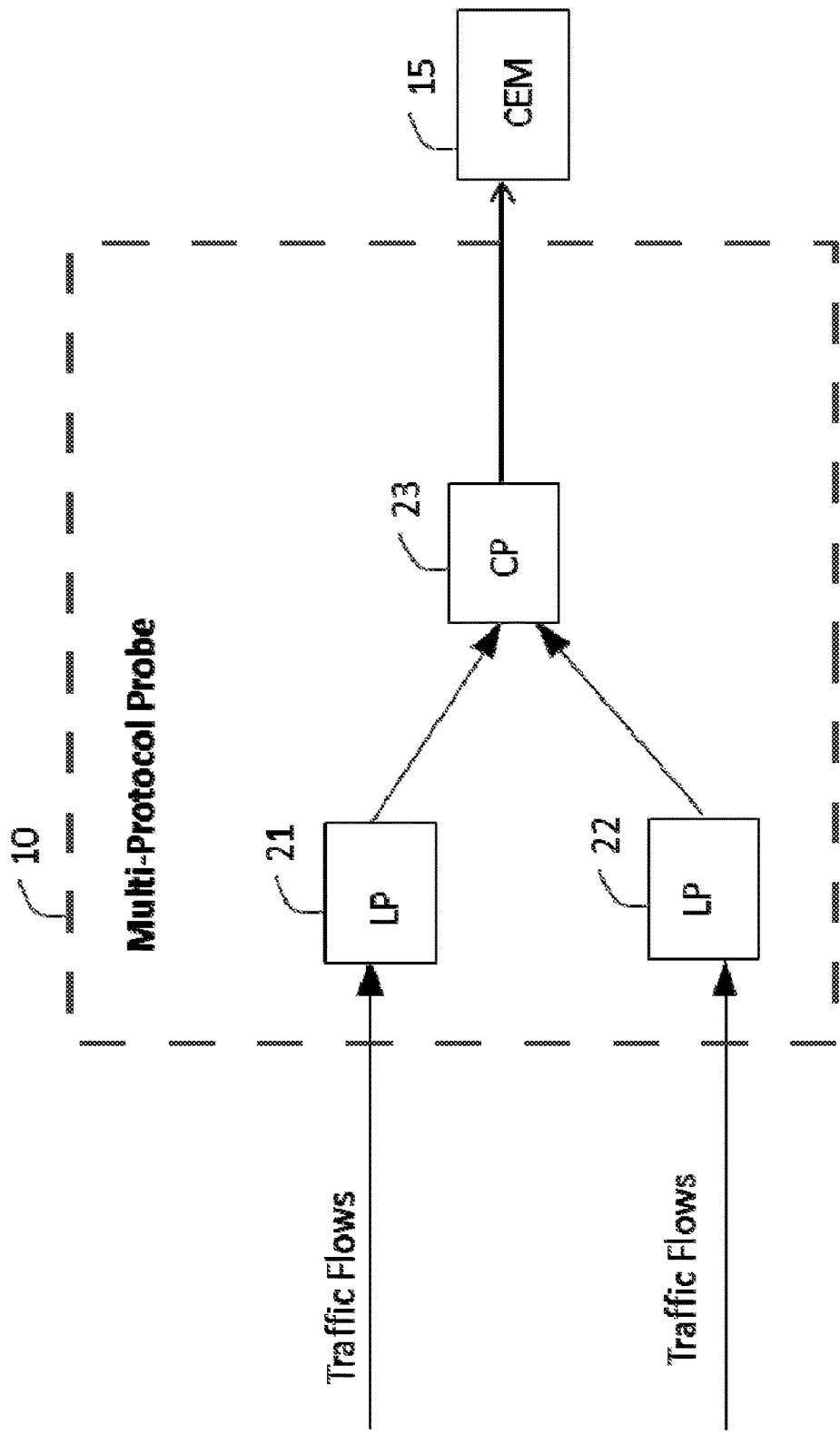
FIG. 2 is a schematic diagram of the probe.

FIGS. 1 and 2 illustrate a multiprotocol monitoring probe in a data network, for example, an LTE network. The multiprotocol probe 10 is a monitoring probe device in a data network, and may be abbreviated as probe thereinafter in the present disclosure. The probe 10 may extract traffic flows from different LTE interfaces such as LTE S11, S1-U, S1-MME, S3, S6a or S10 interfaces over 10 Gbps optical links. The aforementioned LTE interfaces are defined in Third Generation Partnership Project (3GPP) Technical Specifications.

The probe 10 extracts high-speed directional traffic flows from both the control-plane (C-plane) and the user-plane (U-plane) of the LTE network. The C-plane traffic flows are related to control information such as those transported between evolved Node B (eNB)/base stations 11 and a mobility management entity (MME) 12 for directional traffic flows. The U-plane traffic flows are related to Internet Protocol (IP) packet data transported between mobile devices through the eNB 11 and any servers located in Internet/Cloud 14. The directional traffic flow is characterized by a five-tuple, including: source IP address; source port number; destination IP address; destination port number; and Layer 4 protocol.

In 3G/LTE networks, on the U-plane, the directional traffic flow is characterized by five-tuple and Tunnel End Identifier (TEID). Traffic flows in different direction are assigned different TEIDs. In 3G/LTE networks, TEID includes 32 bits. The directional traffic flows is grouped into two categories: uplink traffic flow; and downlink traffic flow. Traffic flow originating from a user equipment (UE) or a customer premise equipment to any server in Internet is called uplink traffic flow; traffic flow going to UE or customer premise equipment from any server or networking equipment in Internet is called downlink traffic flow.

The probe 10 may use Deep packet inspection (DPI) to obtain packets from directional traffic flows. DPI has a different definition of flow because it is important for the detection of protocols to have both directions of traffic flows analysed together. For present purposes, both directions of traffic flows being analysed together is called a bidirectional traffic flow. In DPI it is frequently called a unique flow. Like the traffic flow, the bidirectional traffic flow is specified by a five-tuple, including: lower IP address; lower port number; upper IP address; upper port number; and Layer 4 protocol.

The difference is that instead of a source and a destination, there are a lower and an upper address. For the IP address, lower means numerically lower and upper means numerically higher. For example, if the source address is 192.168.1.17 port 2192 and the destination is 11.20.5.34 port 80, then the lower IP address and port are 11.20.5.34 port 80, and the upper IP address and port are 192.168.1.17 port 2192. However, lower port number refers to the port associated with the lower IP address and not the numerically lower port number. Similarly, higher port number refers to the port associated with the higher IP addresses. The five-tuple is the same regardless of the source and destination. This means that the direction of data transfer cannot be determined from the bidirectional flow five-tuple. The meaning of the IP protocol field is the same as in the traffic flow five-tuple.

A bidirectional traffic flow groups the two directional traffic flows corresponding to opposite directions together. That is, the source of one traffic flow corresponds to the destination of the other, and vice versa.

The application traffic flow is a concept used in the probe 10. An application flow is specified by the three-tuple, including: internal IP address; external IP address; and application ID. The internal IP address is the IP address of the UE or the mobile phone. It is called internal because it is internal to the operator's network. The external address is external to the user's mobile network, for example, in the Internet 14. The application ID corresponds to the Layer 7 or application layer protocol; for instance, Hypertext Transfer Protocol (HTTP), Internet Message Access Protocol (IMAP) etc. This three-tuple is bidirectional like the bidirectional flow five-tuple. It is similar in another way in that the application ID generally indicates the destination port and the IP protocol. The exception is if a server is using an unconventional port number for that application/protocol.

An application traffic flow is the aggregation of possibly multiple bidirectional flows. For example, if a UE is connected to a website through the eNB 11 and Serving Gateway/Serving General Packet Radio Service Support Node (SGSN) 13 and has multiple pages open then there will be multiple bidirectional traffic flows each with a different source port in the HTTP or application traffic flow between that UE and the webserver. The probe 10 uses DPI to obtain application layer protocol of the received packets in directional traffic flows. The application layer protocol has unique Application ID in the three-tuple definition of the application traffic flow. Furthermore, the probe 10 may analyse application traffic flows, directional traffic flows and bidirectional traffic flows, and then generate traffic flow statistics report related to these traffic flows to, for instance, a customer experience management (CEM) system 15 in the core network of the LTE system.

Before each request-response traffic flow occurring on U-plane, there is at least one or some control signalling/messages transferred on C-plane. Referring to FIG. 2, the probe 10 generally includes at least two link processors (LP) in the U-plane, and a correlation processor (CP) in the C-plane. In use, the CP receives output from a LP and correlates the LP traffic flow statistics with customer/subscriber information. The customer/subscriber information is obtained from the control signalling/messages transferred on the C-plane by LPs or other processing units (not shown in any diagram of present disclosure) in the probe. At a final stage, the CP generates a traffic flow statistics report regarding individual customer/subscriber or application traffic flows of individual customer/subscriber to a customer experience management (CEM) system 15.

In order to calculate traffic flow metrics/statistics such as peak traffic flow or peak bit rate (peak bits per second) for every directional traffic flow, average active traffic flow or average active bit rate (average active bits per second) for every directional traffic flow, peak bit rate for every application traffic flow, and average active bit rate for every application traffic flow, the probe 10 extracts directional traffic flows on both the C-plane and U-plane. The probe 10 further calculates the traffic flow statistics by correlating multiple bidirectional traffic flows corresponding to application traffic flows with customer/subscriber information, and then reports the calculated statistics/traffic flow metrics to the CEM system 15 in the core network. A simple implementation of such extraction, calculation and processing is described in further detail below by reference to FIG. 2.

A simplified example implementation of the probe 10 includes two LPs 21, 22 connected to a CP 23. Due to great number of incoming packets from large number of different directional traffic flows, the probe 10 may include more than 2 LPs. For instance, there may be tens of thousands of packets arriving from thousands of directional traffic flows within just one second duration. Optionally, the probe 10 includes M of LPs, where M is a positive integer, M>=2. M of LPs work in parallel to extract directional traffic flows on C-plane and U-plane, and applies DPI detection on IP packets on each directional traffic flow. Each LP is a multicore processor, where each core in the multicore processor may be assigned to process one directional traffic flow at one instance. For example, each LP has 1,024 cores/threads. A bidirectional traffic flow may be characterised by a five tuple characteristics such as {source IP address, destination IP address, source port number, destination port number, Layer 3 Protocol}. In general, Layer 3 protocol is any one of IP or Internet Control Message Protocol (ICMP). In most cases, the Layer 3 Protocol is IP. In other implementation, a bidirectional traffic flow may be characterised by a five tuple characteristics such as {Upper IP address, Lower IP address, Upper port number, Lower port number, Layer 4 Protocol}. In general, Layer 4 protocol is any one of Transport Control Protocol (TCP) or User Datagram Protocol (UDP).

The LPs 21, 22 use DPI to obtain packets in directional traffic flows, and then sniff, decode, detect, and extract the IP packet. The LPs 21, 22 also use DPI to obtain application protocol type of packets in bidirectional traffic flows. Bidirectional traffic flows with the same five-tuple are processed by the same LP. In some cases, the IP packet is associated with upper layer applications such as Web Browsing (eg, Hypertext Transfer Protocol (HTTP)/Hypertext Transfer Protocol Secure (HTPPS) protocol), streaming (eg, Realtime Transport Protocol (RTP)/Real Time Streaming Protocol (RSTP) protocol), VoIP (eg, RTP/Session Initiation Protocol (SIP) protocol) or email (eg, Simple Mail Transfer Protocol (SMTP) protocol), and the metadata associated with the upper layer applications such as Universal Resource Locator (URL), coding format and file type are also extracted by each LP.

Before each request-response traffic flow occurring on U-plane, there is at least one or some control signalling transferred on C-plane. The LPs 21, 22 report customer/subscriber information extracted from control signalling/messages on C-plane and bidirectional traffic flows from U-plane to the CP. After receiving output from the LPs 21, 22, the CP 23 correlates the bidirectional traffic flows corresponding to application traffic flows with the customer/subscriber information. At a final stage, the CP 23 generates a traffic flow statistics report regarding uplink directional traffic flows, downlink traffic flows or application traffic flows to the CEM 15.

Figure 3:
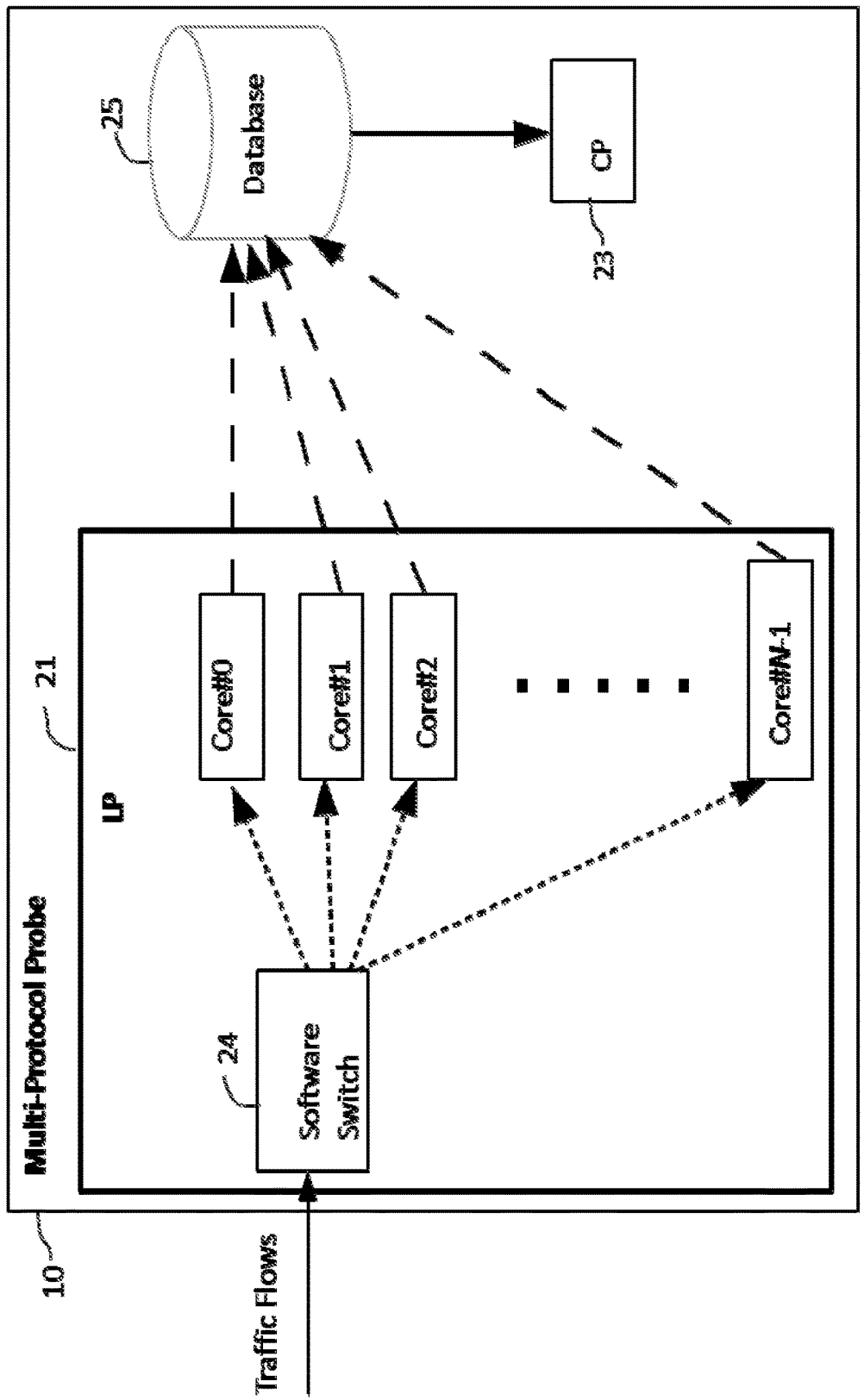
FIGS. 3 and 4 are schematic diagrams illustrating a method according to an embodiment of the invention that is implemented in the probe.
Figure 4:
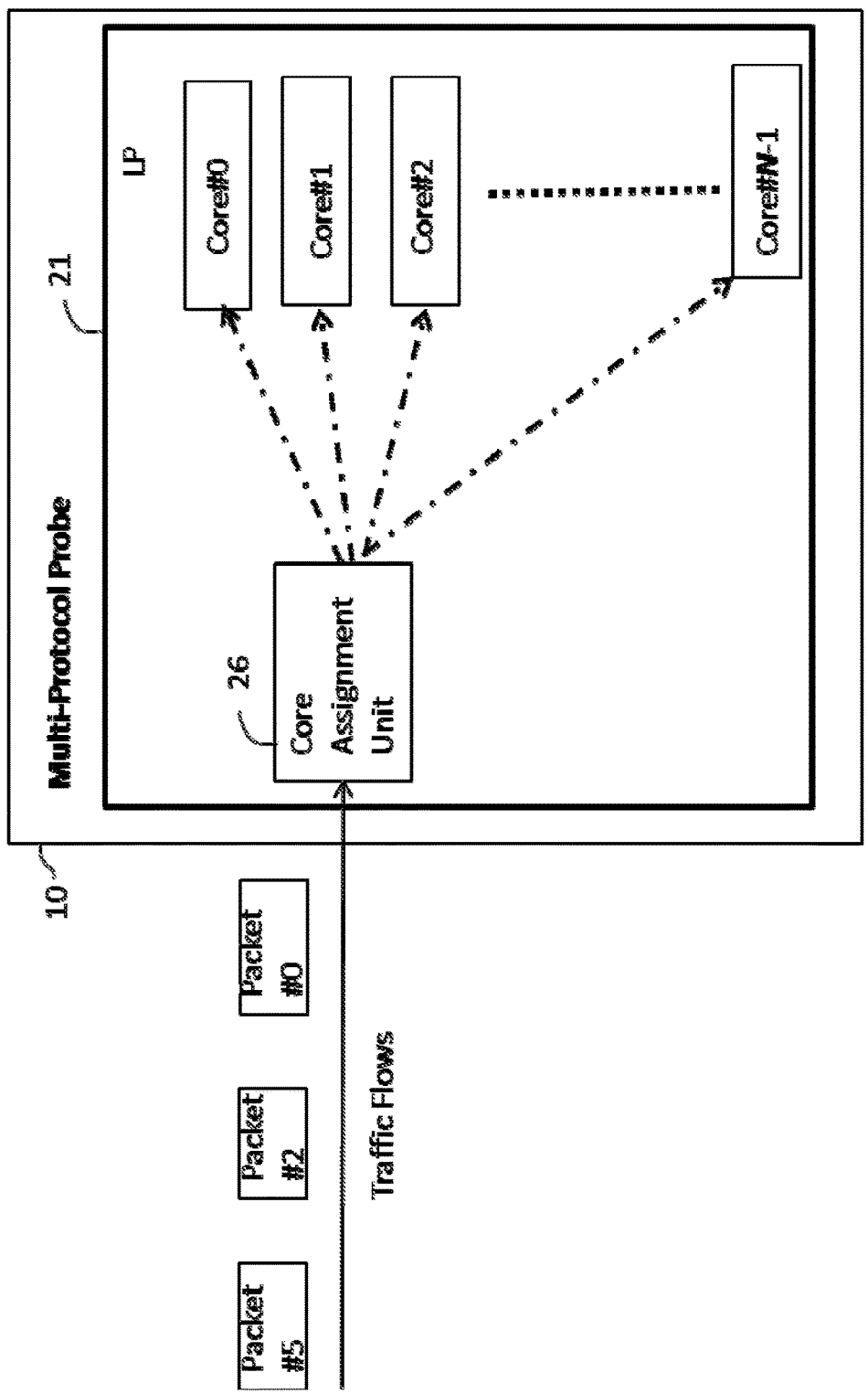

As mentioned previously, the probe 10 may constantly need to receive and process great number of incoming packets from large number of different directional traffic flows, such as tens of thousands of packets arriving from thousands of directional traffic flows within just one second duration. Thus, each LP may include a multicore/multithread processor system for processing such great number of incoming packets. FIGS. 3 and 4 illustrate a LP with multicore/multithread processor architecture. Each LP has multiple cores/threads. All cores/threads in each LP concurrently detect, decode, accumulate, process, and compute information on received data packets on high speed directional traffic flows. All cores/threads in each LP also update, report or export information derived from data packets or bidirectional traffic statistics at a minute boundary/reporting period. For example, each LP may transfer all active bidirectional traffic statistics at each minute boundary/reporting period to a database device 25, and then the CP 23 obtains all active bidirectional traffic statistics from the database device 25. The high speed directional traffic flows received by the LP 21 include data packets belonging to different sources or even different directional traffic flows in the communication system. In order to extract application protocol from the packet of the bidirectional traffic flows, one of multicores/multi-threads of the LP is assigned to process incoming packets/incoming traffic flows for useful information.

Directional traffic flows with the same source-destination pair such as the same {Upper IP address, Lower IP address, Upper port number, Lower port number} are regarded as associated with the same traffic flow identifier. In other words, the same core/thread/processing engine in the multicore/multi-thread processor system is assigned to process packets belonging to the same bidirectional traffic flows in fast transmission links.

Referring to FIG. 4, the LP 21 includes a multicore/multithread processor system, such as N of cores/threads/worker threads in the multicore/multithread processor system. After the assignment of core/thread/worker thread on packets of incoming bidirectional traffic flows, the software switch 24 outputs the packet(s) assigned to particular core#K, where K is positive integer between 0 and N−1.

In order to address the operational constraints on processing packets for any specific bidirectional traffic flow, the same core/thread/worker in any LP is assigned to process incoming packets belonging to the same bidirectional traffic flow in high speed transmission links. In order to achieve such quick assignment of cores/threads within these operational constraints, an embodiment of the method of the present invention generally includes the steps described below. The method may be executed by the core assignment unit 26 in FIG. 4 on dynamic memory allocation of storage device (not shown in FIG. 4) of the LP 21 or the probe 10.

The method starts by generating a worker array containing M elements, where the worker array includes worker indexes respectively representing N of cores in the multicore processor system. For example, the worker array may be presented as {0, 1, 2, 3, . . . , N−1, 0, 1, 2, . . . , N−1, 0, 1 . . . , L−1}, where M % N=L, where "%" is modulus operator. In order to make every core/thread/working thread with almost balanced load, M is chosen to be greater than N with $M=2^k$, where k, N and M are positive integers. N represents the total number of cores/threads/working threads in the multicore processor system of one LP; M represents the size of the worker array of the same LP. In order to maintain evenly distributed events/packets and thus achieve even distribution on working loads of N of cores, in a preferred embodiment, M is chosen to be much greater than N, and may be mathematically expressed as '$M \gg N$'.

Next, each LP in the probe 10 receives an incoming packet in directional traffic flows, and extracts a traffic flow identifier from the incoming packet. For example, in a directional traffic flow, the source IP address (IPv4 address or IPv6 address) is extracted, but in the other direction of traffic flow, the destination IP address is extracted. If there is any IP encapsulation, then the IP header of encapsulation is stripped off in order to get IP address directly associated with UE (the client/the customer).

After extracting the traffic flow identifier from the packet, a randomization mathematical calculation/hash function calculation is performed on an identity value (eg, source IP address) derived or extracted from the incoming packet to thereby generate a randomised value V. The identity values used for identifying directional traffic flows are, for example, selected from a group comprising source IP address, destination IP address, source port number, destination port number, TEID, etc. Other equivalent identity values and conventional mathematical techniques may also be used to perform the randomization mathematical calculation.

For instance, in a hash function calculation, the extracted IP address is called Hash_Input. For an IPv4 address, 32-bits Hash_Input is transformed by the hash function calculation/operations for mixing up locations of original 32 bits in the extracted IP address. For example, the hash function calculation/operation includes the following operations in sequence, and the parameter "intaddr" is the Hash_Input and the value of Hash_Input is computed according to the operations shown below.

```
{
    intaddr ^= intaddr >> 16;
    intaddr *= 0x85ebca6b;
    intaddr ^= intaddr >> 13;
    intaddr *= 0xc2b2ae35;
    intaddr ^= intaddr >> 16;
}
```

The hash function calculation/operation applied on Hash_Input is, for example, a MurMur HASH function to thereby generate a HASH result V from Hash_Input. For example, the hash calculation/operation shown immediately above includes: (a) 32-bit IPv4 address is shifted to right by 16 bits and a bit-wise Exclusive OR (XOR) operation is applied for the shifted data and the original data; (b) the first bit-wise XORed result after bit-wise XOR operation is multiplied by a first constant, for example, a hexadecimal number of "85ebca6b" to obtain a first multiplied result; (c) the first multiplied result is shifted to right by 13 bits, and a bit-wise XOR operation is applied for the shifted first multiplied result and the first multiplied result to obtain a second bit-wise XORed result; (d) the second bit-wise XORed result is multiplied by a second constant, for example, a hexadecimal number of "c2b2ae35" to obtain a second multiplied result; (e) the second multiplied result is shifted to the right by 16 bits and a bit-wise XOR operation is applied for the shifted second multiplied result and the second multiplied result to finally obtain the HASH result V.

For a 128-bit IPv6 address, a transformation of the IPv6 address is not required. For example, the LP operates a MurMur Hash function on 128-bit IPv6 address to randomize the locations of original 128 bits and thus generate a HASH result V in 32 bits. In general, the HASH operation applied on either 32 bit IP address or 128 bit IP address should randomize the Keys (IP addresses), and thus obtain HASHes (i.e., the HASH result V). Here the HASH result V is not wholly randomized, but the probability of collisions for any 2 Keys after HASH operation is reduced to an acceptable level.

The method continues where the LP 21 computes a logical AND calculation of the HASH result V and M−1, and thus generates a pointer index value/lookup index PI. For example, when M=256, the logical AND operation on M−1 and randomised value V may generate a value of 30, and the value "30" is the lookup index value PI.

Next, the lookup index value PI is used by the LP to locate a worker index in the worker array, and assign the core with the worker index for the incoming packet. For example, when index value PI=30, then the 30$^{th}$ worker index in the work array indicates the core which is assigned to process the packet. For instance, the core assignment unit 26 shown in FIG. 4 may provide the received packet to the assigned core, the assigned core may further extract information from the received packet such as the number of bytes, application protocol type, and/or metadata associated with the upper layer application in the packet. The metadata associated with the upper layer application in the received packet may be, for example, URL, coding format and file type. Next, the assigned core may update the extracted information to the traffic flow statistics of a bidirectional traffic flow to which the packet belongs, where the traffic flow statistics of all bidirectional traffic flows may be stored in memory allocations of a storage unit (not shown in FIG. 4) of the LP 21. In another embodiment of the present invention, the core assignment unit 26 may provide the packet to the assigned core, the assigned core may extract information from the packet such as the number of bytes, application protocol type, and/or metadata associated with the upper layer application in the packet. Next, the assigned core may update the extracted information to the traffic flow statistics of a bidirectional traffic flow to which the packet belongs over a predetermined reporting period. The predetermined reporting period may be, for example, 60 seconds. In yet another embodiment of the present invention, the core assignment unit may provide the packet to the assigned core, the assigned core may extract information from the packet such as the number of bytes, application protocol type, and/or metadata associated with the upper layer application in the packet. Next, the assigned core may update the extracted information to the traffic flow statistics of a bidirectional traffic flow to which the packet belongs over a lifetime of the bidirectional traffic flow. The lifetime of the bidirectional traffic flow may be, for example, 10 minutes.

All mathematical/computation operations in the above steps are very fast, since the LP is required to continuously and quickly process bidirectional traffic flows of 10 Gbps or even higher. Also, such processing of the LP cannot tolerate long latency; otherwise, incoming packets of bidirectional traffic flows will be lost due to buffer overflow. Therefore, the Hash function is a fast Hash operation, and any Hash operation that does not result in long computation time can be used in the step of obtaining the HASH result V from the traffic flow identifier of the packet. In order to process packets belonging to the same bidirectional traffic flows by the same core/thread in the LP, either Upper IP address or Lower IP address may be used as the traffic flow identifier of the packet. Alternatively, in other implementations, both Upper IP address and Upper port number may be used as the traffic flow identifiers, and there is another step of combing the traffic flow identifiers in correct order to obtain the HASH_Input. Thus, application of the embodiment of the method in the present invention can provide that packets arriving in different times but belonging to the same directional traffic flows or even the same bi-directional traffic flows are always processed by the same core/thread of the same LP.

Application of the embodiment of the method of the invention described above advantageously provides that all incoming packets of directional traffic flows are processed with a correct order.

Table 1 below illustrates an example of receiving a sequences of incoming packets associated with different traffic flow identifiers but the same core/thread/worker thread can be assigned to process incoming packets with the same traffic flow identifier.

TABLE 1

| Packet # | User ID | SRC ID | Core # |
|---|---|---|---|
| 0 | 1 | SRC1 | 2 |
| 1 | 2 | SRC2 | 3 |
| 2 | 1 | SRC1 | 2 |
| 3 | 1 | SRC1 | 2 |
| 4 | 2 | SRC2 | 3 |
| 5 | 3 | SRC1 | 2 |

Table 1 and FIG. 4 illustrate an example of receiving a sequence of incoming packets associated with different traffic flow identifiers but the same core/thread/worker thread can be assigned to process incoming packets with the same traffic flow identifier. The example in Table 1 shows only six incoming packets for simplicity of illustration.

Referring to FIG. 4, the method of the invention is implemented, for example, as a core assignment unit 26 in a LP 21 that either forms part of operating system of the probe 10, or operates on top of the operating system. In addition, the core assignment unit 26 works with the packet inspection unit (not shown in FIG. 4) to extract traffic flow identifier from every packet, and applies randomization calculation or HASH function calculation on the traffic flow identifier (SRC ID). In the example shown in FIG. 4, when receiving the packet with Packet#0, the core assignment unit 26 obtains SRC ID=SRC1, and further determines the packet with Packet#0 belongs to a user with User ID=1. Similar extractions and calculations are applied on all incoming packets, thus packets respectively with Packet#0, Packet#1, Packet#2, Packet#3, Packet#4, Packet#5 are discovered as belonging to SRC ID=SRC2, SRC1, SRC1, SRC2, SRC1, and so forth. As mentioned previously, the SRC ID can be either Upper IP address, Lower IP address, a combination of Upper IP address and Upper port number, a combination of Lower IP address and Lower port number, a combination of Upper IP address, Upper port number and Layer 4 protocol ID, or a combination of Lower IP address, Lower port number and Layer 4 protocol ID. The selection of SRC_ID is not limited to the aforementioned type or combinations, and any source identification information extracted from the packet of incoming directional traffic flows may be used as the traffic flow identifier.

The pre-calculated/preconfigured worker array is based upon number of cores/threads/worker threads in a single link processor and is, for example, represented as: $\{0, 1, 2, 3, \ldots, N-1, 0, 1, 2, \ldots, N-1, 0, 1 \ldots, L-1\}$, where M % N=L, where M indicates the size of the worker array, where "%" is modulo operator. For example, the Packet#0 may have traffic flow identifier as IPv6 address, and the HASH result V calculated on the traffic flow identifier of Packet#0 is 0xFE88101E expressed in hexadecimal format. Next, the core assignment unit 26 in the LP 21 applies a logical AND operation on the HASH result V with the M (as the size of the worker array) to generate a lookup index value PI as 0x1e expressed in hexadecimal format. In a generalized illustration, the worker array may be represented as $\{0, 1, 2, 3, \ldots, N-1, 0, 1, 2, N-1 \ldots, L-1\}$, where M is the size of the worker array, $M=2^k$, N is the number of cores, M % N=L, and L<N, where "%" is modulus operator, and L, k, M and N are positive integers.

After conversion of lookup index value PI into decimal format as 30, the core assignment unit 26 finds the 30$^{th}$ element in the worker array as the core number (core#). In this example, the core/thread/worker thread with a preconfigured core#2 is assigned to the packets (e.g., Packet#0, Packet#2, Packet#3, Packet#5 shown in Table 1) with the same traffic flow identifier SRC ID=1.

The logical AND operation referred to above generates minimal deviation from conventional approach of division operation of V/M or modulus operation of V % M, but achieves similar core assignment result with much less computation time since division and modulus operation is much heavier computational intensive processes compared to the logical AND operation.

Figure 5:
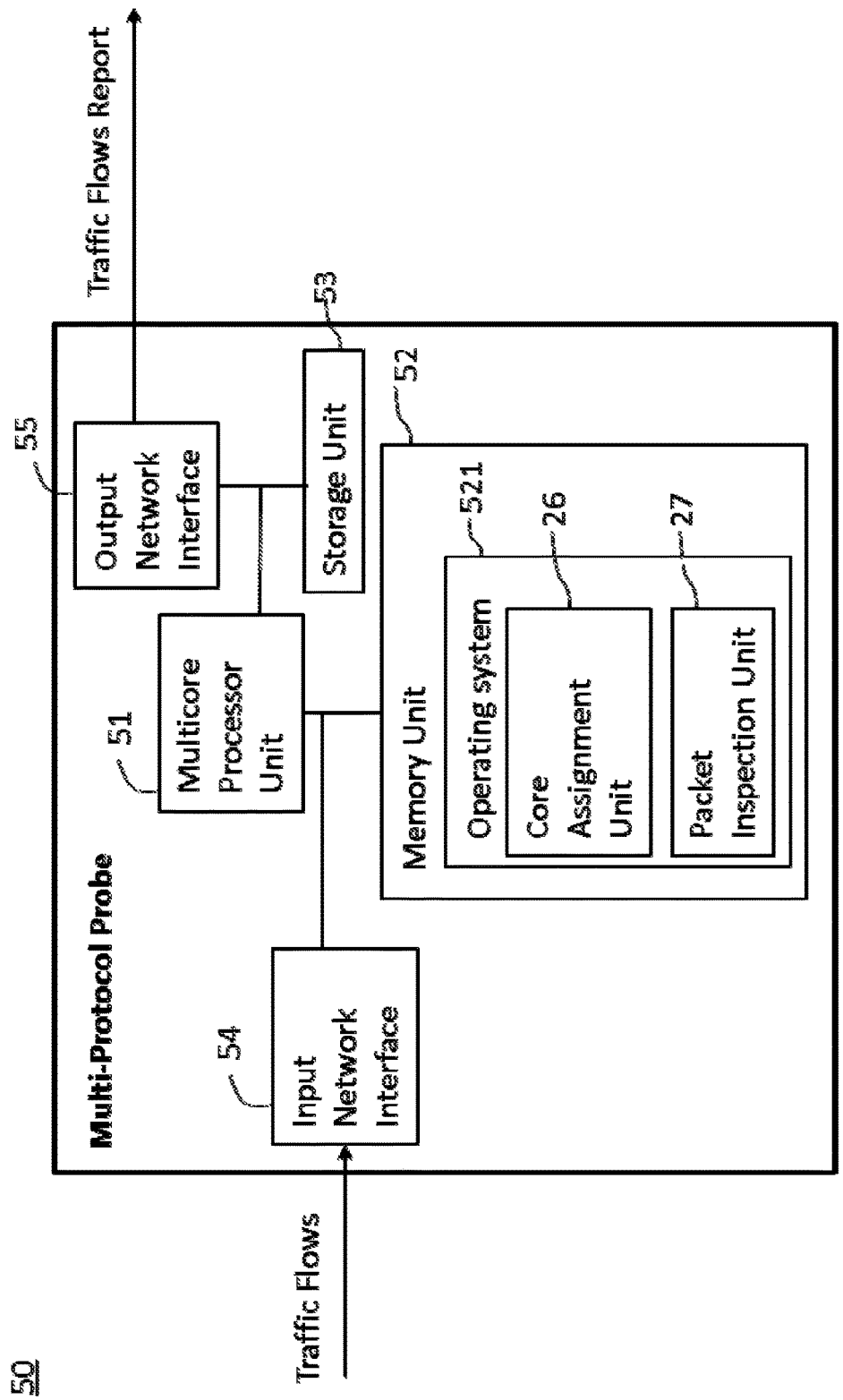
FIG. 5 is functional block diagram of a link processor of the probe.

FIG. 5 is functional block diagram of the probe according to an exemplary embodiment of the present invention. Referring to FIG. 5, a link processor 50 (as an internal component of multi-protocol probe (probe) 10) may include a multicore processor unit 51, a memory unit 52, a storage unit 53, an input network interface 54, and an output network interface 55. The multicore processor unit 51 is logically connected to the memory unit 52, the storage unit 53, the input network interface 54 and the output network interface 55. The multicore processor unit 51 may include multiple cores, for instance, Core#0, Core#1, Core#2, . . . , Core#N as shown in FIGS. 3 and 4.

The input network interface 54 may be connected to one of LTE interfaces such as LTE S11, S1-U, S1-MME, S3, S6a or S10 interfaces in the LTE network. However, in other embodiment, the link processor 50 may be deployed to analyse traffic flows in other wireless/wired communication networks such as Global System for Mobile Communications (GSM), Code division multiple access 2000 (CDMA2000), Universal Mobile Telecommunications System (UMTS) communication networks or optical communication networks. Therefore, in other embodiments, the input network interface 54 may be connected to relevant interfaces in the aforementioned communication networks.

Referring to FIG. 5, the multicore processor unit 51 executes an operation system 521 in the memory unit 52 and also execute the core assignment unit 26 and the packet inspection unit 27 through the operating system 521. The core assignment unit 26, when executed by one of the cores in the multicore processor unit 51, may be configured to assign one of the remaining N cores in the multicore processor unit 51 to process the incoming packets received through the input network interface 54. The packet inspection unit 27, when executed by the other core in the multicore processor unit 51, may be configured to perform DPI on the packets received through the input network interface 54. In particular, the packet inspection unit 27 may provide traffic flow identifier of the received packet, such as source IP address, destination IP address, source port number, destination port number, TEID, to the core assignment unit 26. The core assignment unit 26 then assigns one of the remaining N cores in the multicore processor unit 51 to process the received packet according to the traffic flow identifier of the received packet. The assigned one of the N cores in the multicore processor unit 51 may further compute information on the assigned packets and transfer all active bidirectional traffic flows statistics at preconfigured reporting period to a storage unit 53 such as the database device 25 shown in FIG. 3. The information, such as traffic flows statistics, stored in the storage unit 53 may be further output to another processing device such as the CP 23 shown in FIG. 3 through the output network interface 55.

Figure 6:
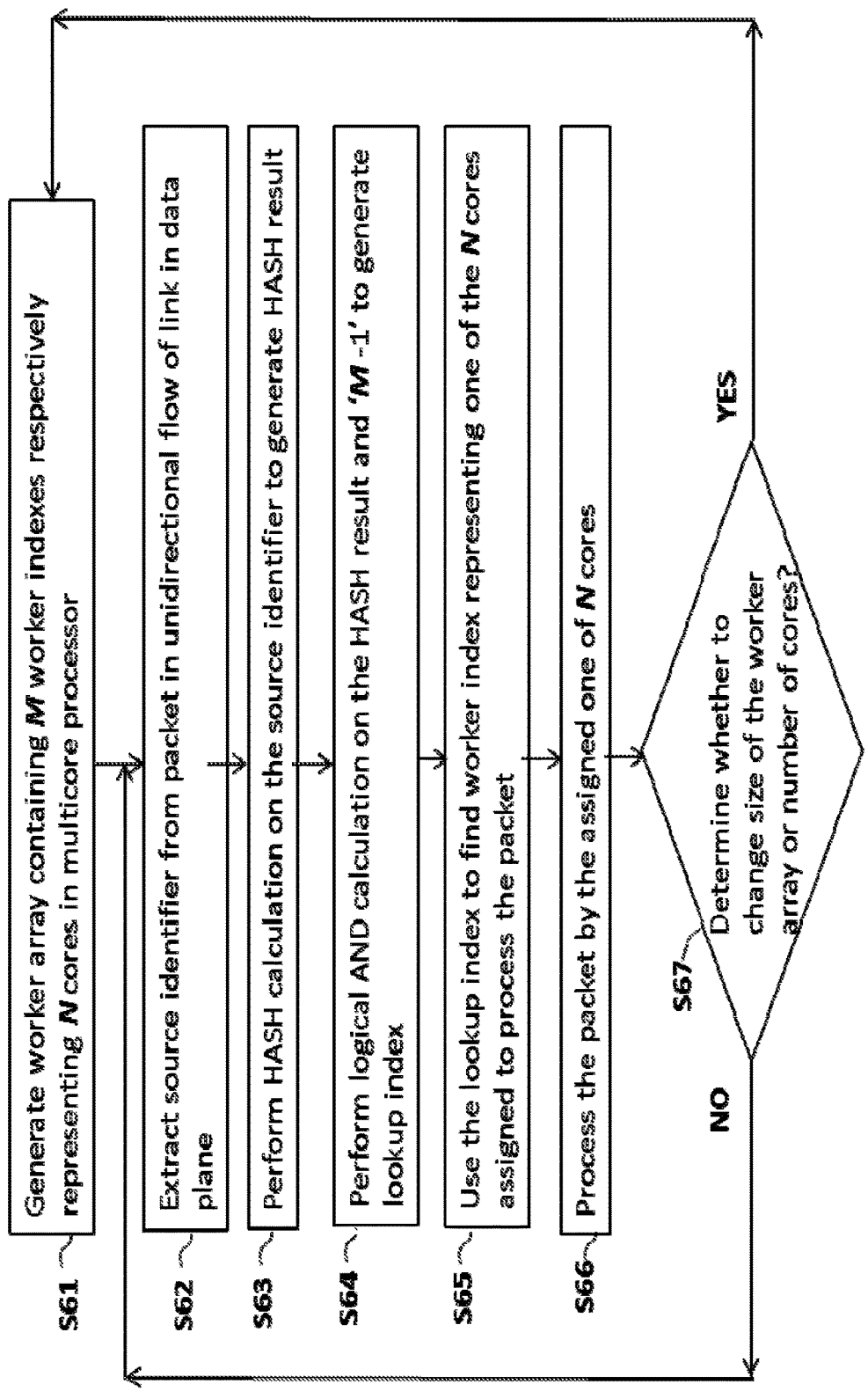
FIG. 6 is a flowchart illustrating method of assigning one of multiple cores to process an incoming packet in the probe.

FIG. 6 is a flowchart illustrating method of assigning one of multiple cores to process an incoming packet in the link processor of the probe. Referring to both FIGS. 5 and 6, the method of assigning one of N cores in the multicore processor unit 51 to process an incoming packet in the link processor 50 may include following steps S61-S67. It should be noted that the core assignment unit 26 may not allocate all remaining cores in the multicore processor unit 51 to process the received packet; and in other embodiment, the core assignment unit 26 may dynamically adjust the number of cores which may be assigned to process the received packets.

In step S61, the core assignment unit 26 is configured to generate a worker array containing M worker indexes, where the M worker indexes respectively representing N cores in a multicore processor in a data plane of a data network, where $M=2^k$, where k, M and N are positive integers. Persons skilled in the art of the present invention should acknowledge that the data plane may be called user plane as defined in some communication system. Here, the data plane or the user plane is different from a control plane, on which the control signalling/control messages traversed between network elements in the data network. The core assignment unit 26 may temporarily store the worker array in a memory allocation of the same memory unit 52. Also, the core assignment unit 26 may generate a preconfigured worker array size parameter M-1, and may temporarily store the preconfigured worker array size parameter M-1 in another memory allocation of the same memory unit 52. Furthermore, the core assignment unit 26 may align the starting memory location of the worker array to cache line boundary of cache memory in the multicore processor unit 51 for greater efficiency in assigning one of the N cores to process the incoming packet.

In step S62, the core assignment unit 26 is configured to request the packet inspection unit 27 to extract a traffic flow identifier from a packet in a traffic flow of a link in the data plane. Here, the traffic flow can be unidirectional traffic flow or bidirectional traffic flow. If the core assignment unit 26 is configured to extract traffic flow identifier from packets in bidirectional traffic flow via the packet inspection unit 27, the link processor 50 is required to be equipped with at least two input network interfaces such as input network interfaces 54a, 54b. The traffic flow identifier may be, for example, source IP address, destination IP address, source port number, destination port number, TEID.

In step S63, the core assignment unit 26 is configured to perform a HASH function calculation on the traffic flow identifier to generate a HASH result V.

In step S64, the core assignment unit 26 is configured to perform a logical AND calculation on the HASH result V and M−1 to generate a lookup index PI.

In step S65, the core assignment unit 26 is configured to use the lookup index PI to find a worker index in the worker array that represents one of N cores assigned to process the packet.

In step S66, the core assignment unit 26 is configured to process the packet by the assigned one of N cores.

After step S66, the core assignment unit 26 is configured for assigning one of N cores to process another incoming packet received from the input network interface. In particular, the core assignment unit 26 in step S67 may determine whether to change size of the worker array (i.e., changing the value of M to another value of P, where P is different from M) or number of cores (i.e., changing the value of N) which may be assigned to process incoming packet. If the determination result is yes in the step S67, the step S61 is executed after the step S67; and if the determination result is no in the step S67, the step S61 is skipped for the next incoming packet and the step S62 is executed straight after the step S67.

Figure 10:
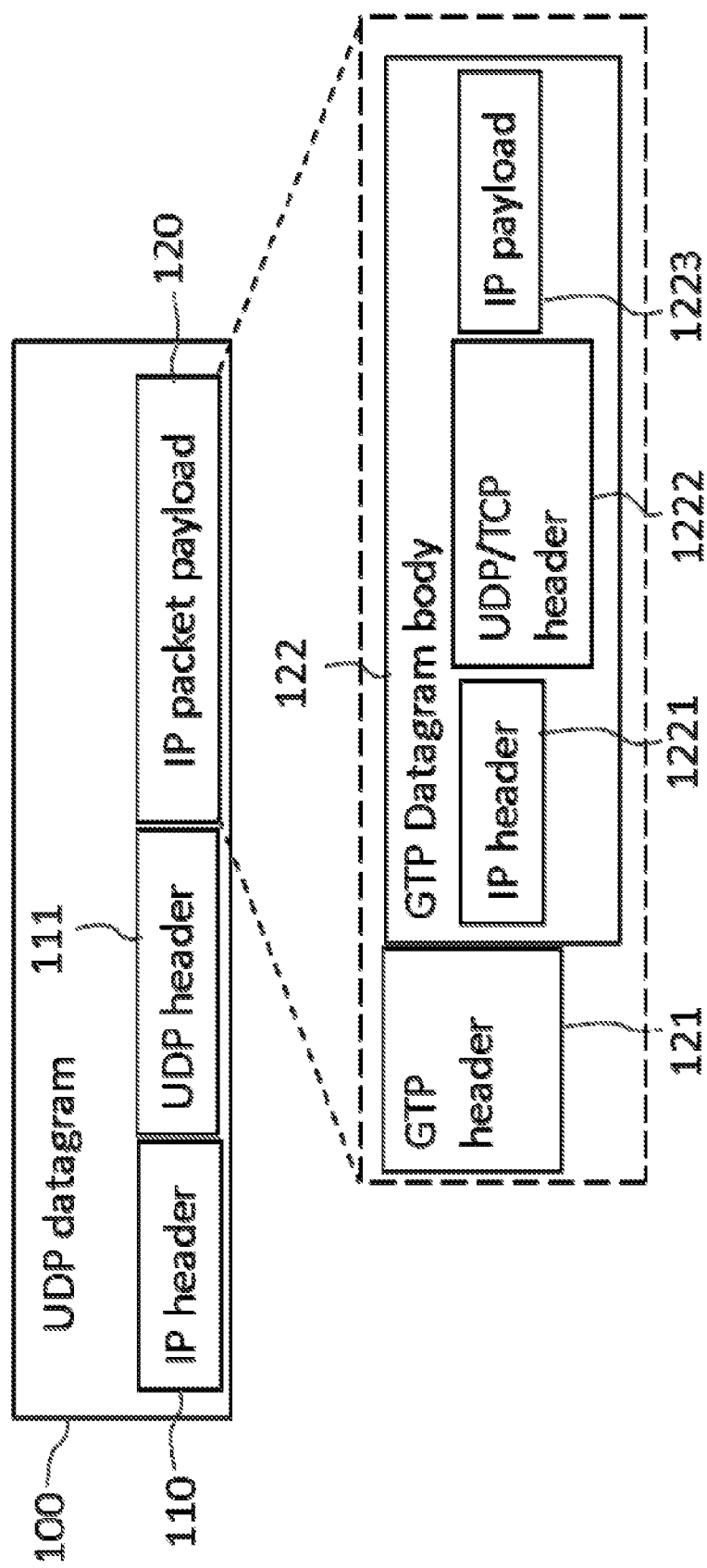
FIG. 10 is a simplified schematic diagram illustrating GTP tunnel datagram encapsulated in UDP datagram according to another embodiment.
Figure 11:
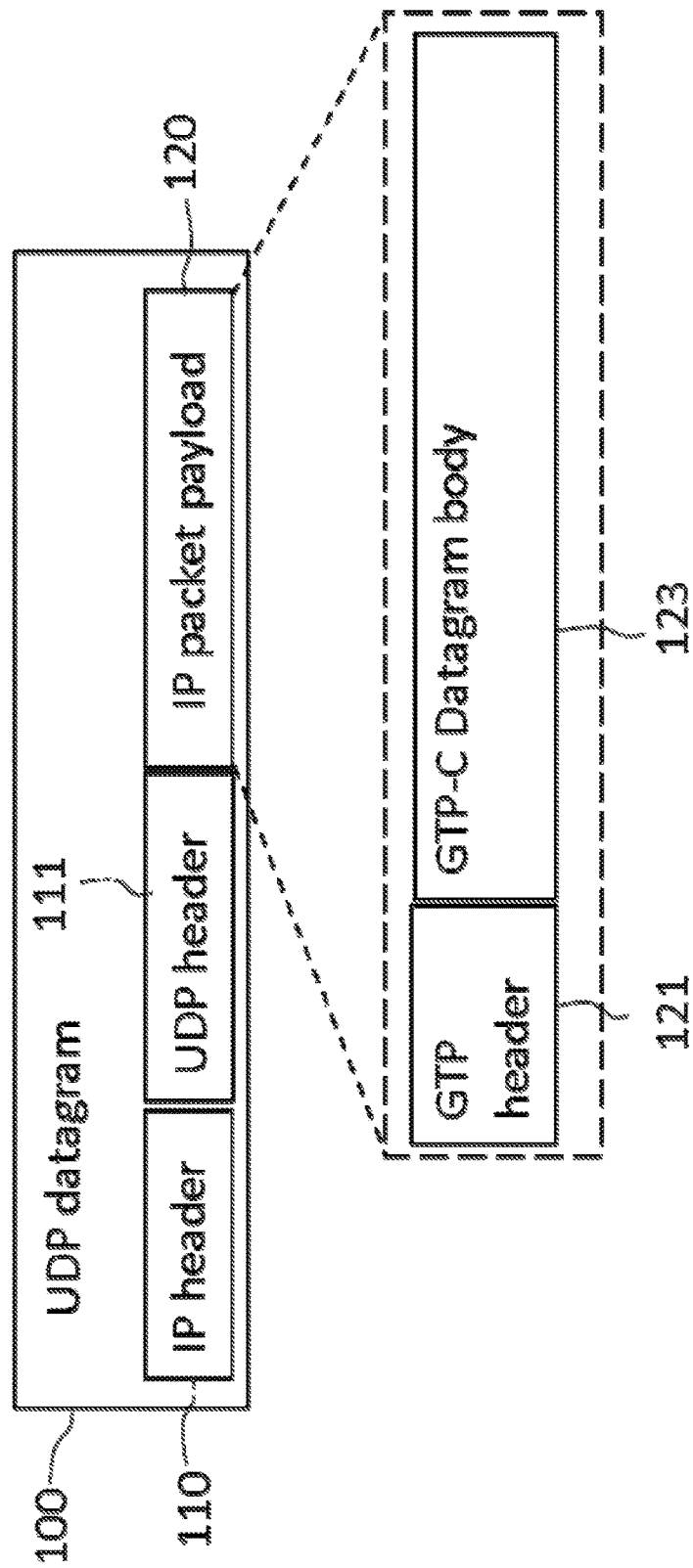
FIG. 11 is a simplified schematic diagram illustrating GTP-C message encapsulated in UDP datagram according to another embodiment.

How the core assignment unit 26 extracts a traffic flow identifier or at least one traffic flow identifier from a packet in a traffic flow of a link in the data plane through the packet inspection unit 27 will be explained in accordance with FIGS. 10 and 11. FIG. 10 is a simplified schematic diagram illustrating GTP tunnel datagram encapsulated in UDP datagram according to another embodiment. GPRS Tunneling Protocol (GTP) is a group of IP-based communications protocols used to carry general packet radio service (GPRS) within Global System for Mobile Communications (GSM), Universal Mobile Telecommunications System (UMTS) and LTE networks. In the example shown in FIG. 10, GTP is layered on top of User Datagram Protocol (UDP). In this case, UDP datagram 100 carries the GTP tunnel datagram consisting of GTP header 121 and GTP datagram body 122. In user plane (or data plane), the GTP datagram body encapsulates at least the IP header 1221, TCP header/UDP header 1222, and IP payload 1223 of user datagram such as transmitted between a UE and a server (no matter within the LTE network or located in Internet outside the domain of LTE network). The whole GTP tunnel datagram is carried in IP packet payload 120. The IP header 110 contains at least source IP address and destination IP address, where the source IP address and destination IP address are internal IP addresses in LTE network. In most cases, the source IP address or the destination IP address is either IP address of an eNB connected to a UE or that of a SGW.

The GTP header also contains at least TEID which is the receiver's TEID internal to LTE network. For user plane user data transmission or control plane signalling transmission, TEID is a uniquely assigned identifier in GTP tunnel datagram. As such, for downlink traffic flow to a particular UE, there will be a unique TEID assigned to the eNB, connected to the UE, in the GTP tunnel datagram carrying the user plane IP address. In the opposite direction, for uplink traffic flow from the same UE, there will be another TEID assigned to the SGW, connected with the eNB.

Persons skilled in the art should acknowledge that the GTP can be used in GSM and UMTS network so the source IP address or the destination IP address are either IP address of an eNB connected to a UE or that of a SGW in GSM/UMTS network. Likewise, TEID can be internal to GSM/UMTS network.

In a first example, the core assignment unit 26 may extract source IP address, destination IP address, source port number and destination port number of a packet in the step S63, and group the extracted source IP address, destination IP address, source port number and destination port number of the packet as a number formed by {source IP address} (32 bits/128 bits) concatenated with {destination IP address} (32 bits/128 bits) concatenated with {source port number} concatenated with {destination port number}. Here, it should be noted that, the source IP address in one direction of traffic flow can be destination IP address of traffic flow in opposite direction. As such, in a downlink traffic flow, the core assignment unit 26 may group extracted source IP address, destination IP address, source port number and destination port number of the packet as a number formed by {source IP address} concatenated with {destination IP address} concatenated with {source port number} concatenated with {destination port number}. In an uplink traffic flow, the core assignment unit 26 may group extracted source IP address, destination IP address, source port number and destination port number of another packet as a number formed by {destination IP address} concatenated with {source IP address} concatenated with {destination port number} concatenated with {source port number}.

In the first example, source IP address, destination IP address, source port number, destination port number extracted by the core assignment unit 26 from the IP packet or UDP datagram can be extracted from the IP header 110 or UDP header 111 via the packet inspection unit 27.

In a second example, source IP address, destination IP address, source port number, destination port number extracted by the core assignment unit 26 from the IP packet or UDP datagram can be extracted from the IP header 1221 or UDP header/TCP header 1222 via the packet inspection unit 27.

In a third example, in step S63, the core assignment unit 26 may extract destination user plane TEID of a first GTP tunnel (carrying a first packet) from traffic flow in one direction and further extract source user plane TEID from GTP tunnel payload of the same first GTP tunnel in opposite direction. It should be noted that, in one direction of traffic flow, the source TEID can be the destination TEID of traffic flow in the opposite direction. In step S63, the core assignment unit 26 may extract user plane destination TEID of a second GTP tunnel (carrying a second packet) from the downlink traffic flow and further extract user plane source TEID from GTP tunnel payload of the same second GTP tunnel datagram. In step S64, the core assignment unit 26 may group extracted source TEID and destination TEID of the first GTP tunnel datagram as a number formed by {source TEID} concatenated with {destination TEID}. In the opposite direction, the core assignment unit 26 may group extracted source TEID and destination TEID of the second GTP tunnel datagram as a number formed by {destination TEID} concatenated with {source TEID}.

In the third example, the same approach can be applied by the core assignment unit 26 on control plane messages or signalling containers. FIG. 11 is a simplified schematic diagram illustrating GTP-C message encapsulated in UDP datagram according to another embodiment. The UDP datagram 100 is quite similar to that shown in FIG. 10 except that the GTP header 121 is followed by a control plane GTP tunnel (GTP-C) datagram body 123. The GTP-C message is carried by the GTP-C datagram body 123.

In a fourth example, in order to achieve high performance of processing incoming packets in data plane, the core assignment unit 26 may just extract source IP address of packets as the traffic flow identifier in the downlink traffic flow via the packet inspection unit 27, but extract destination IP address of packets as the traffic flow identifier in the uplink traffic flow via the packet inspection unit 27. The extraction of traffic flow identifier refers to the step S63 shown in FIG. 6. Here, the source IP address or the destination IP address of packets may be extracted from the IP header 110 shown in FIGS. 10, 11. Then, in the following step S64, the core assignment unit 26 further performs the HASH function calculation on the extracted traffic flow identifier to generate a HASH result V.

In a fifth example, in order to achieve high performance of processing incoming packets in data plane, the core assignment unit 26 may just extract TEID of GTP tunnel as the traffic flow identifier via the packet inspection unit 27 in any direction of the link. The extraction of traffic flow identifier refers to the step S63 shown in FIG. 6. Here, the TEID may be extracted from the GTP header 121 shown in FIGS. 10, 11. Then, in the following step S64, the core assignment unit 26 further performs the HASH function calculation on the extracted traffic flow identifier to generate a HASH result V.

The preceding exemplary embodiments of the present invention may be implemented in software/instruction codes/application logic/instruction set/computer program codes (executed by one or more processors), may be fully implemented in hardware, or implemented in a combination of software and hardware. For instance, the software (e.g., application logic, an instruction set) is maintained on any one of various conventional computer-readable media. In the present disclosure, a "computer-readable medium" may be any storage media or means that can carry, store, communicate, propagate or transport the instructions for use by or in connection with an instruction execution system, apparatus, or device, such as a computing device, the probe 10 in FIGS. 1-4 or the link processor 50 shown in FIG. 5. A computer-readable medium may include a computer-readable storage medium (e.g., a physical device) that may be any media or means that can carry or store the instructions for use by or in connection with a system, apparatus, or device, such as a computer or a communication device. For instance, the memory unit 52 may include the computer-readable medium which may include computer program code, when executed by the one of the cores in the multicore processor unit 51, may cause the core assignment unit 26 and the packet inspection unit 27 in the link processor 50 to perform procedures/steps illustrated in FIGS. 3-4 and 6.

Figure 7:
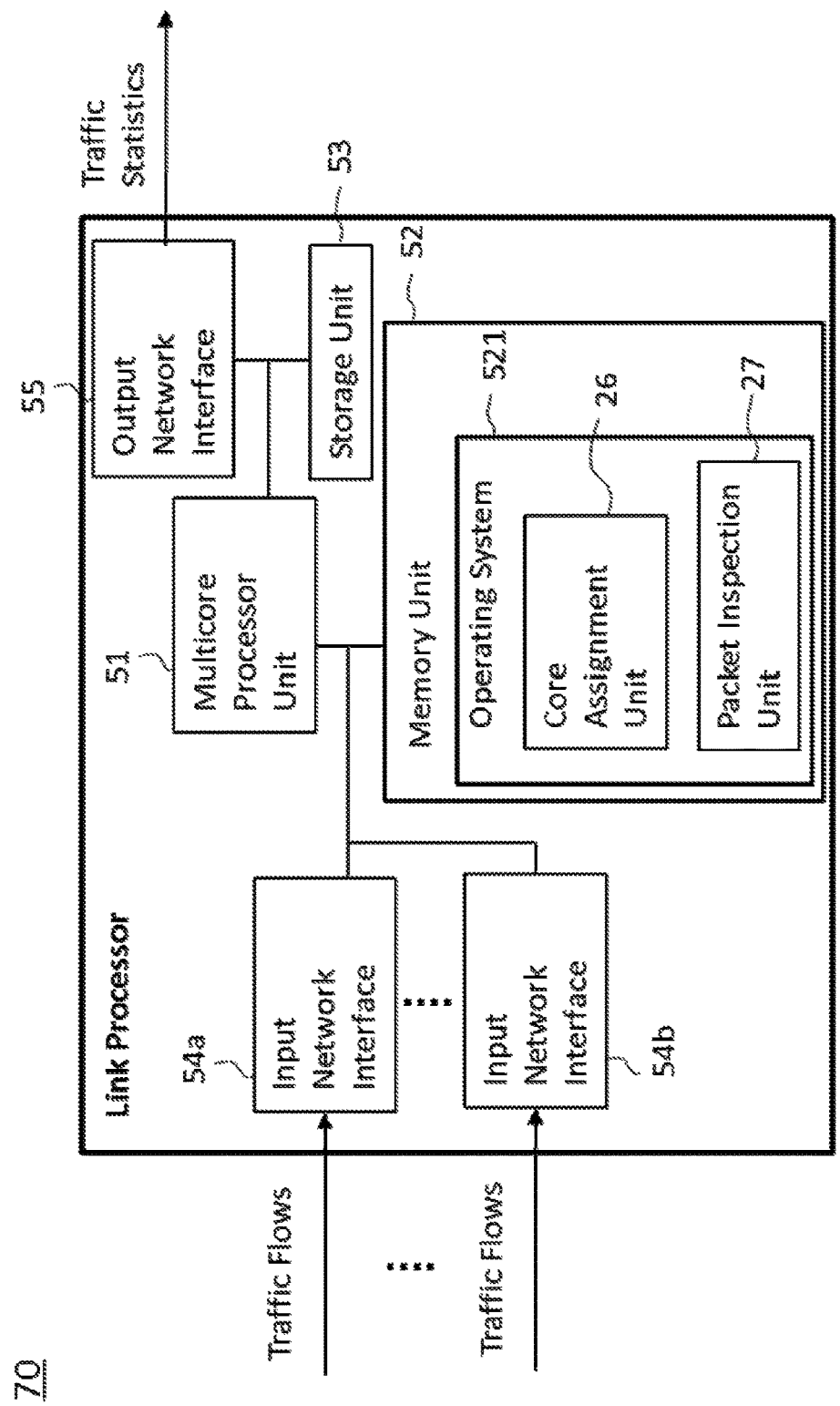
FIG. 7 is functional block diagram of a link processor according to another embodiment.

FIG. 7 is functional block diagram of a link processor according to another embodiment. Referring to FIG. 7, a link processor 70 (as an internal component of the multi-protocol probe (probe) 10) may include a multicore processor unit 51, a memory unit 52, a storage unit 53, input network interfaces 54a and 54b, and an output network interface 55. The multicore processor unit 51 is logically connected to the memory unit 52, the storage unit 53, the input network interfaces 54a and 54b, and the output network interface 55.

The input network interface 54a may be connected to one of LTE interfaces such as LTE S1-U interface and the input network interface 54b may be connected to another LTE interface such as LTE S1-MME in the LTE network. However, in other embodiment, the link processor 50 may be deployed to analyse traffic flows in other wireless/wired communication networks such as GSM, Code division multiple access 2000 (CDMA2000), UMTS communication networks or optical communication networks. Therefore, in other embodiments, a link processor may include different input network interfaces 54 connected to relevant interfaces in the aforementioned communication networks.

Referring to FIG. 7, the multicore processor unit 51 executes an operation system 521 in the memory unit 52 and also execute the core assignment unit 26 and the packet inspection unit 27 through the operating system 521. The core assignment unit 26, when executed by one of the cores in the multicore processor unit 51, may be configured to assign one of the remaining N cores in the multicore processor unit 51 to process the incoming packets received through the input network interface 54. The packet inspection unit 27, when executed by the other core in the multicore processor unit 51, may be configured to perform DPI on the packets received through the input network interface 54. In particular, the packet inspection unit 27 may provide traffic flow identifier of the received packet, such as source IP address, destination IP address, source port number, destination port number, TEID, to the core assignment unit 26. The core assignment unit 26 then assigns one of the remaining N cores in the multicore processor unit 51 to process the received packet according to the traffic flow identifier of the received packet. The assigned one of the N cores in the multicore processor unit 51 may further compute information on the assigned packets and transfer all active bidirectional traffic flows statistics at preconfigured reporting period to a storage unit 53 such as the database device 25 shown in FIG. 3. The information, such as traffic flows statistics, stored in the storage unit 53 may be further output to another processing device such as the CP 23 shown in FIG. 3 through the output network interface 55.

Figure 8:
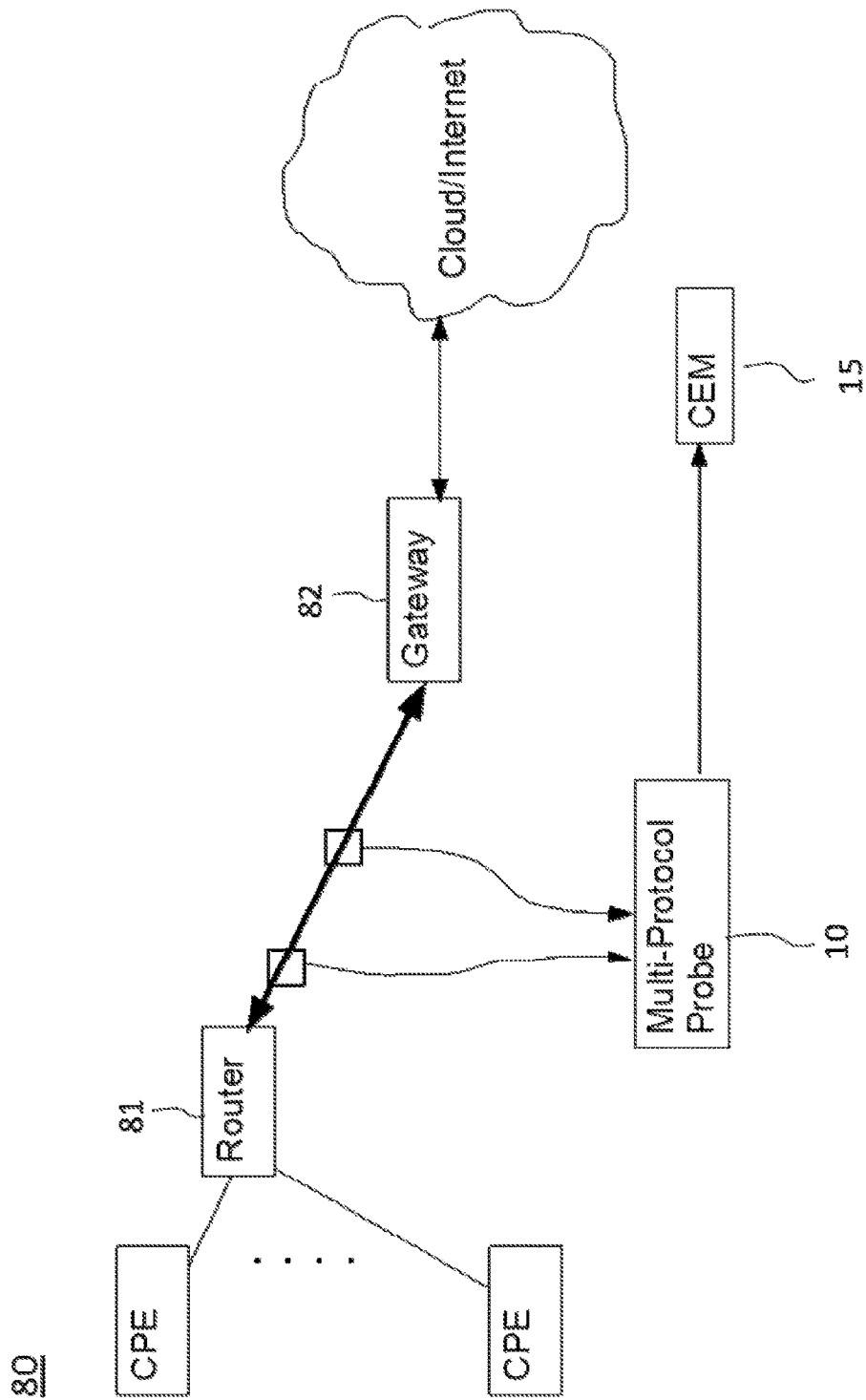
FIG. 8 is a schematic diagram of a generic IP data network including the multiprotocol monitoring probe.

FIG. 8 is a schematic diagram of a generic IP data network including the multiprotocol monitoring probe. FIG. 8 illustrates the architecture of an exemplary data network 80 according to an embodiment of the invention. Referring to FIG. 7, a Multi-Protocol Probe 10 (the Probe 100) connects to a link between a gateway 82 and an internal router 81 further connecting to a plurality of customer premise equipments (CPEs) in the data network 80. There could be multiple computing devices connecting to the data network 80 through each CPE. Each CPE is at least assigned with an IP address. For small business and home business, a single IP address, whether static or dynamic, may be assigned to each CPE. For large business, each CPE may be further connect to a cloud/Internet which contains a plurality of servers, so each CPE may be assigned a range of IP addresses, which may be referred to as Aggregated IP addresses.

The probe 10 transparently receives packets on a plurality of traffic flows directly associated with each CPE. It is noted that the probe 10 merely extracts copies of packets from traffic flows in the data network 80, transparently processes the received packets and does not affect transmission of the packets in the data network 80. The probe 10 is further configured to generate statistic reports based on the received packets and send the generated reports to the CEM system 15. In order to process the received packets efficiently, each link processor in the probe 10 may include multicore processor and implement the method of assigning one of multiple cores to process an incoming packet received by the link processor similar to the technical disclosure illustrated in accordance with FIGS. 1-7. In this embodiment, the traffic flow identifier may be, for example, source IP address, source port number or a combination of source IP address and source port number. For another example, source IP address and destination IP address can be used as the traffic flow identifier by the probe 10. Alternatively, combination of source IP address, destination IP address, source port number and destination port number can be used as the traffic flow identifier by the probe 10.

Figure 9:
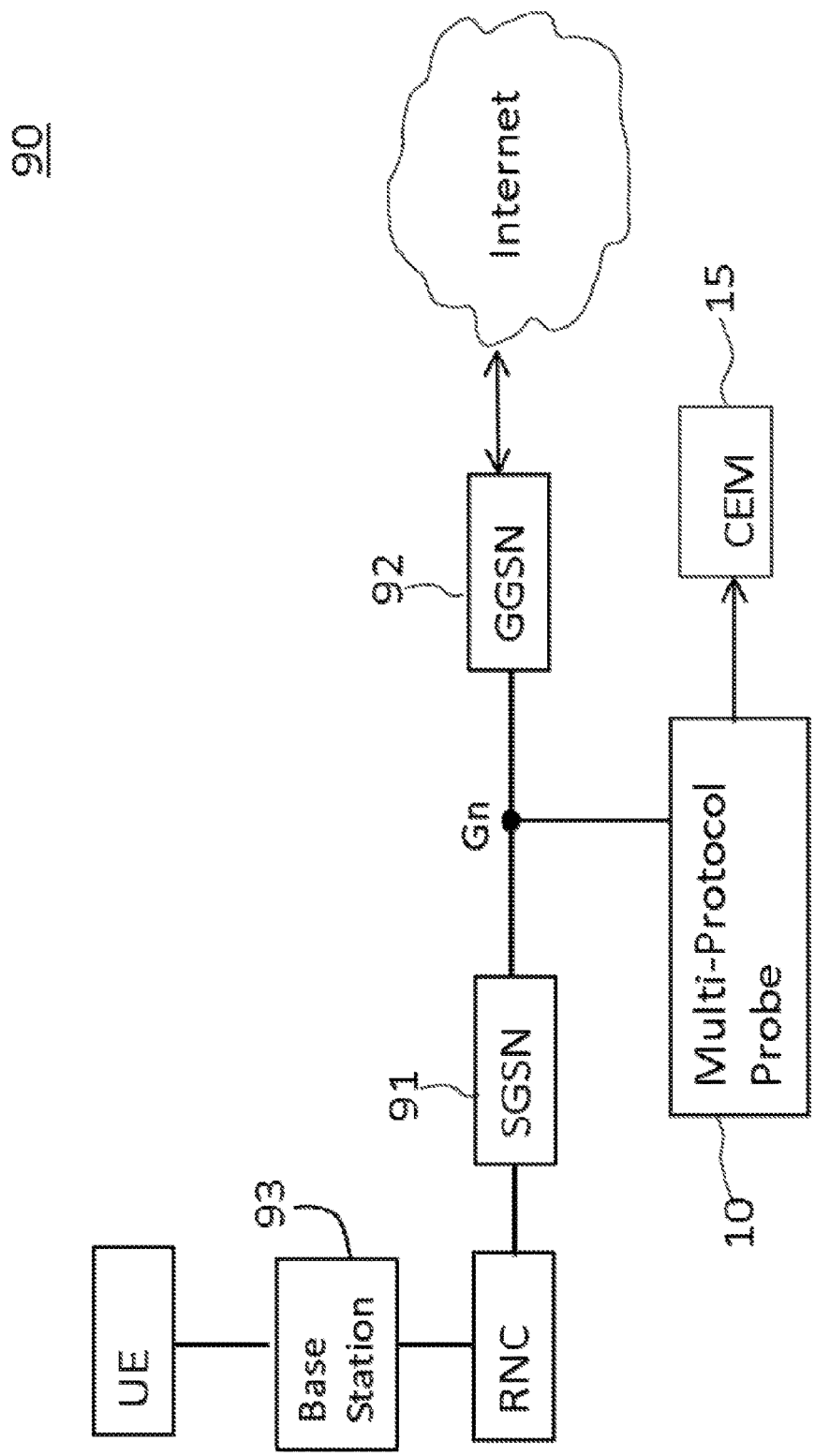
FIG. 9 is a schematic diagram of a 3G network including the multiprotocol monitoring probe.

FIG. 9 is a schematic diagram of a 3G network including the multiprotocol monitoring probe. FIG. 9 illustrates the architecture of a 3G network as an exemplary data network 90 according to one embodiment of the invention. In the data network 90, the probe 10 may connect to a link between Gateway GPRS Support Node (GGSN) 91 and SGSN 92 to extract traffic flows from interface Gn. In this particular data network 90, the probe 10 does not necessarily connect to the base station 93. Instead, the probe 10 transparently receives packets on a plurality of traffic flows directly associated with each UE. It is noted that the probe 10 merely extracts copies of packets from traffic flows in the data network 90, transparently processes the received packets and does not affect transmission of the packets in the data network 90. The probe 10 is further configured to generate statistic reports based on the received packets and send the generated reports to the CEM system 15. In order to process the received packets efficiently, each link processor in the probe 10 may include multicore processor and implement the method of assigning one of multiple cores to process an incoming packet received by the link processor similar to the technical disclosure illustrated in accordance with FIGS. 1-7. In this embodiment, the traffic flow identifier may be, for example, source IP address, destination IP address, source port number, destination port number, TEID.

Embodiments of the method of the present invention provide useful solutions for multicore processing of bidirectional traffic flows in data networks.

The above embodiments have been described by way of example only and modifications are possible within the scope of the claims that follow.

The technical benefits or technical advantages of implementing embodiments of the invention can be explained below:

(1) In order to address the operational constraints on processing packets for any specific bidirectional traffic flow, the same core/thread/worker in the multi-core processor unit of any Link Processor is assigned to process incoming packets belonging to the same bidirectional traffic flow in high speed transmission links. After extracting the traffic flow identifier from the packet, hash function calculation is performed on an identity value (eg, source IP address, source-destination pair such as {Upper IP address, Lower IP address, Upper port number, Lower port number}, merely source IP address in one direction/destination IP address in opposite direction, merely TEID of GTP tunnel, etc) derived or extracted from the incoming packet to thereby generate a randomised value V. The randomised value V can be regarded as a way to balance load of cores among the multicore processor unit. Hash function with the same identity value from different packets arriving at different time instances still generate the same results. As such, the incoming packets belonging to the same bidirectional traffic flow in high speed transmission links will be assigned to the same core/thread/worker in the multicore processor unit of any Link Processor.

(2) Conventional approach of assigning a core out of multiple cores in the multicore processor unit may use division operation of V/M or modulus operation of V % M, where V is an index derived from a user datagram or belonging to the user datagram, and M is the total number of cores in the multicore processor unit. However, logical AND operation adopted in the present invention generates minimal deviation from the conventional approach of division operation of V/M or modulus operation of V % M, but achieves similar core assignment result with much less computation time since division and modulus operation is much heavier computational intensive processes compared to the logical AND operation.

In view of the aforementioned explanations, it is clear that embodiments of the method of assigning a core from multiple cores to process a data packet/user datagram in a data network can shorten time in determining which core should be assigned to process the core, thereby achieving load-balancing among multiple cores and also meeting the operational constraints by assigning the same core/thread/worker in the multicore processor unit to process incoming packets belonging to the same bidirectional traffic flow. Owing to quick assignment of the same core/thread/worker in the multicore processor unit to process incoming packets belonging to the same bidirectional traffic flow, embodiments of the probe can easily overcome other problems in calculating traffic flow statistics when duplicate packets arrive or packets arrive out of order.

The invention claimed is:

1. A method of assigning a core to process a packet in a data network, comprising:

extracting a traffic flow identifier from a packet in a traffic flow of a link in data plane at an input network interface, wherein the traffic flow is at least one of a unidirectional traffic flow, a bidirectional directional flow, and an application traffic flow, wherein the bidirectional traffic flow corresponds to two directional traffic flows having opposite directions, and wherein the application traffic flow is an aggregation of multiple bidirectional traffic flows;

performing a HASH function calculation on the traffic flow identifier to generate a HASH result V at a core assignment unit;

performing a logical AND calculation on the HASH result V and a preconfigured worker array size parameter to generate a lookup index at the core assignment unit;

using the lookup index to identify a worker index in a preconfigured worker array having a size "M", wherein the worker array comprises a plurality of worker indexes representing a plurality of cores (N) in a multi-core processor unit, wherein the size of the preconfigured worker array (M) is greater than N, and wherein the worker index identified represents one of the N cores assigned to process the packet at the core assignment unit; and processing the packet by the assigned one of N cores from a multi-core processor unit.

2. The method as claimed in claim 1, wherein before the step of extracting the traffic flow identifier from the packet in the unidirectional flow of the link in the data plane, the method at the core assignment unit, comprises the steps of: generating the preconfigured worker array to contain M worker indexes that respectively represent N cores in a multicore processor in the data plane of the data network, wherein M=2.sup.k, and where k, M and N are positive integers; and generating the preconfigured worker array size parameter to be M−1, wherein the data plane is at least one of a control plane (C-plane) and a user-plane (U-plane) of a Long-Term evolution (LTE) network.

3. The method as claimed in claim 2, wherein after the step of processing the packet by the assigned one of N cores, the method comprises the steps of: determining whether to change the size of the preconfigured worker array, wherein: if it is determined to change the size of the preconfigured worker array, then at the core assignment unit, generating another preconfigured worker array containing P worker indexes and generating the preconfigured worker array size parameter before extracting a traffic flow identifier from another packet in the unidirectional flow of a link in the data plane, wherein P is different from M; and if it is determined not to change the size of the preconfigured worker array, then at the core assignment unit, extracting a traffic flow identifier from another packet in a traffic flow of a link in the data plane.

4. The method as claimed in claim 2, wherein after the step of processing the packet by the assigned one of N cores, the method comprises the steps of:
   determining whether to change number of cores which are to be assigned to process packets in the unidirectional flow of a link in the data plane, wherein; if it is determined to change the number of cores, then at the core assignment unit, generating another preconfigured worker array containing M worker indexes and generating the preconfigured worker array size parameter before extracting a traffic flow identifier from another packet in the unidirectional flow of a link in the data plane; and if it is determined not to change the number of cores, then at the core assignment unit, extracting a traffic flow identifier from another packet in a traffic flow of a link in the data plane.

5. The method as claimed in claim 2, wherein the worker array is represented as {0, 1, 2, 3 ... N−1, 0, 1, 2, 3 ... N−1, 0, 1, 2, 3 ... L−1}, where M % N=L, where "%" is modulo operator and L is a positive integer, wherein M indicates the size of the worker array.

6. The method as claimed in claim 2, wherein the traffic flow identifier is:
   a concatenation of source ip address, destination ip address, source port number and destination port number or
   a concatenation of a source tunnel endpoint identifier (teid) and a destination tunnel endpoint identifier (teid) or
   a concatenation of destination ip address, source ip address, destination port number and source port number or
   a concatenation of a destination tunnel endpoint identifier (teid) and source tunnel endpoint identifier (teid).

7. The method as claimed in claim 2, wherein the multi-core processor is a link processor that is configured to collect the bidirectional traffic flow statistics of the link in the data plane.

8. The method as claimed in claim 2, wherein the step of processing the packet by the assigned one of n cores (0, 1, 2, . . . n−1) comprises the steps of: extracting information from the packet; and updating, according to the extracted information, traffic flow statistics of the bidirectional traffic flow to which the packet belongs.

9. A device for multi-core processing in a data network, comprising:
   at least one input network interface configured to receive a packet from a traffic flow of a link in data plane, wherein the traffic flow is at least one of a unidirectional traffic flow, a bidirectional traffic flow, and an application traffic flow, wherein the bidirectional traffic flow corresponds to two directional traffic flows having opposite directions, and wherein the application traffic flow is an aggregation of multiple bidirectional traffic flows;
   a packet inspection unit configured to extract a traffic flow identifier from the packet in the traffic flow of a link in the data plane;
   a multi-core processor unit configured to perform a HASH function calculation on the traffic flow identifier to generate a HASH result V and to perform a logical AND calculation on the HASH result V and a preconfigured worker array size parameter to generate a lookup index; and
   a core assignment unit configured to use the lookup index to identify a worker index in a preconfigured worker array having a size "M", wherein the worker array comprises a plurality of worker indexes representing a plurality of cores "N" in the multi-core processor unit, and wherein the size of the preconfigured worker array (M) is greater than N, and wherein the worker index identified represents one of the N cores assigned to process the packet and the assigned one of N cores processes the packet.

10. The device as claimed in claim 9, wherein the device receives the at least one packet from the unidirectional traffic flow in the data plane via one input network interface, wherein the data plane is at least one of a control plane (C-plane) and a user-plane (U-plane) of a Long-Term evolution (LTE) network.

11. The device as claimed in claim 9, wherein the device receives the at least one packet from the bidirectional traffic flows in the data plane via at least one network interface, wherein the data plane is at least one of a control plane (C-plane) and a user-plane (U-plane) of a Long-Term evolution (LTE) network.

12. The device as claimed in claim 9, wherein the core assignment unit is configured to: generate the preconfigured worker array to contain m worker indexes that respectively representing n cores in a multicore processor in the data plane of the data network, wherein m=2.sup.k and where k, m and n are positive integers; and generate the preconfigured worker array size parameter, which is one unit less than the size of the preconfigured worker array.

13. The device as claimed in claim 10, wherein the core assignment unit is configured to select the traffic flow identifier wherein the traffic flow identifier is:
   a concatenation of source ip address, destination ip address, source port number and destination port number or
   a concatenation of source tunnel endpoint identifier (teid) and a destination tunnel endpoint identifier (teid) or
   a concatenation of destination ip address, source ip address, destination port number and source port number or
   a concatenation of a destination tunnel endpoint identifier (teid) and source tunnel endpoint identifier teid).

14. The device as claimed in claim 10, wherein the multi-core processor unit is an element of a link processor that is configured to collect the bidirectional traffic flow statistics of the link in the data plane.

15. The device as claimed in claim 10, wherein when the assigned one of n cores processes the packet, the assigned one of n cores (0, 1, 2, . . . n−1) is configured to: extract information from the packet; and update, according to the extracted information, traffic flow statistics of the bidirectional traffic flow to which the packet belongs.

16. The method as claimed in claim 1, wherein the unidirectional traffic flow is specified by a five-tuple comprising a source ip address, a source port number, a destination ip address, a destination port number and a layer 4 protocol, and wherein the bidirectional traffic flow is specified by a five-tuple comprising a lower ip address, a lower port number, an upper ip address, an upper port number and layer 4 protocol.

17. The method as claimed in claim 1, wherein the application traffic flow is specified by the three-tuple comprising an internal ip address, an external ip address and an application id.

18. The device as claimed in claim 9, wherein the unidirectional traffic flow is specified by a five-tuple comprising a source ip address, a source port number, a destination ip address, a destination port number and a layer 4 protocol, and wherein the bidirectional traffic flow is specified by a five-tuple comprising a lower ip address, a lower port number, an upper ip address, an upper port number and layer 4 protocol.

19. The device as claimed in claim 9, wherein the application traffic flow is specified by the three-tuple comprising an internal ip address, an external ip address and an application id.

20. The method as claimed in claim 1, wherein generating of the hash result v further comprises:
    performing shift operation on original data associated with the traffic flow identifier and applying an exclusive or (XOR) operation for shifted data and the original data to obtain a first XORed result;
    multiplying the first XORed result with a first constant to obtain a first multiplied result;
    performing shift operation on the first multiplied result and applying an exclusive or (XOR) operation for shifted first multiplied result and the first multiplied result to obtain a second XORed result;
    multiplying the second XORed result with a second constant to obtain a second multiplied result; and
    performing shift operation on the second multiplied result and applying an exclusive or (XOR) operation for shifted second multiplied result and the second multiplied result to obtain the hash result V.

* * * * *